United States Patent
De Cuyper

[19]

[11] Patent Number: 6,079,579
[45] Date of Patent: *Jun. 27, 2000

[54] PREFORM FOR MAKING A CONTAINER

[75] Inventor: Dirk De Cuyper, Destelbergen, Belgium

[73] Assignee: Resilux, Wetteren, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/619,541

[22] PCT Filed: Sep. 27, 1994

[86] PCT No.: PCT/BE94/00061

§ 371 Date: May 22, 1996

§ 102(e) Date: May 22, 1996

[87] PCT Pub. No.: WO95/09113

PCT Pub. Date: Apr. 6, 1995

[30] Foreign Application Priority Data

Sep. 27, 1993 [BE] Belgium ................... 9301010

[51] Int. Cl.[7] ................. B65D 1/02; B29C 17/07
[52] U.S. Cl. ................. 215/41; 215/43; 215/256; 264/529; 264/530; 264/535
[58] Field of Search ................. 215/256, 320, 215/321, 43, 41, 254; 435/296.1; 220/792; 264/529, 530, 535

[56] References Cited

U.S. PATENT DOCUMENTS

| | | | |
|---|---|---|---|
| 2,025,406 | 1/1935 | Whelan | 215/41 |
| 2,039,345 | 5/1936 | Ravenscroft | 215/44 |
| 2,097,912 | 11/1937 | Burnham | 215/44 |
| 2,135,330 | 11/1938 | Desser | 215/44 X |
| 2,521,523 | 9/1950 | Kemper | 215/44 X |
| 3,137,748 | 6/1964 | Makowski | 215/44 X |
| 3,297,184 | 1/1967 | Andelin | 215/320 X |
| 3,784,038 | 1/1974 | Uhlig | 215/44 |
| 3,841,512 | 10/1974 | Botkin . | |
| 3,986,627 | 10/1976 | Zapp | 215/320 X |
| 3,991,904 | 11/1976 | Davis et al. | 215/256 X |
| 4,187,953 | 2/1980 | Turner | 215/321 X |
| 4,451,426 | 5/1984 | Branchadell | 215/44 X |
| 4,550,843 | 11/1985 | Nolan | 215/320 X |
| 4,588,620 | 5/1986 | Marcinek | 215/44 X |
| 4,925,063 | 5/1990 | Ali et al. . | |
| 5,342,663 | 8/1994 | Yokobayashi | 215/43 X |

FOREIGN PATENT DOCUMENTS

| | | |
|---|---|---|
| 0160309 | 5/1985 | European Pat. Off. . |
| 0329881 | 8/1989 | European Pat. Off. . |
| 2139744 | 11/1969 | France . |
| 103069 | 11/1962 | Netherlands ............ 215/256 |
| 1520808 | 8/1978 | United Kingdom ........ 215/256 |
| 8401541 | 4/1984 | WIPO . |
| 8907553 | 8/1989 | WIPO . |
| 9222465 | 12/1992 | WIPO . |

*Primary Examiner*—Gary E. Elkins
*Attorney, Agent, or Firm*—Ladas & Parry

[57] ABSTRACT

A preform adapted for being subjected to blow molding into a container is provided. The preform has a bottom (4), and a tubular wall (1) extending upwardly from the bottom (4) in an elongated manner. The part of the wall (1) opposite bottom (4) forms a pouring spout (20) with a profiled neck (3) encompassing a pouring opening. The pouring spout (20) is integral with the tubular wall (1). The spout (20) has a symmetrically rotational configuration, the neck (3) being provided with an externally extending annular projection (24) forming a first pouring no-drip rib at the opening. The rib includes a downwardly extending pouring surface which extends outwardly from the wall (1). The external profile of the neck (3) is provided with at least one further annular projection (21, 22) forming at least one second no-drip rib (21, 22). The first pouring no-drip rib and the at least second no-drip rib (21, 22) delimitate an annular recess (28) therebetween.

20 Claims, 6 Drawing Sheets

PREFORM FOR MAKING A CONTAINER

BACKGROUND OF THE INVENTION

This invention relates to a preform with closure as an intermediate product for a container, in particular for viscous liquids such as oils and the like.

PRIOR ART

When such liquids are being poured out of a container, such as a bottle, a droplet always remains suspended when the container is straightened up again. In order to prevent said droplet from trickling down along the outside wall of the container, it is already known to use a pouring spout consisting of two pieces which are permanently fixed against each other. In this case one pouring piece is formed by the neck of the container, and the other, the pouring piece proper, is permanently fixed in it. The abovementioned pouring piece proper is provided with an encircling external well, which acts as a droplet collector and ensures that the droplets do not run down along the external surface of the container, but flow back into the container by way of said well. This means that the container can retain a neat appearance.

However, this is an expensive process, due to the fact that two pouring pieces are required for each container. Moreover, due to the fact that the two pouring pieces are generally made of a different material, additional operations are necessary if the containers are to be recycled after use. This immediately makes the refuse processing more time-consuming.

OBJECTS OF THE INVENTION

The object of this invention is to eliminate the abovementioned drawbacks. To this end, the preform according to the invention is adapted for being subjected to blow molding a container, the preform having a bottom, a tubular wall extending upwardly from the bottom in an elongated manner, the part of the wall opposite said bottom forming a pouring spout with a profiled neck encompassing a pouring opening. The pouring spout is integral with the tublar wall, the spout having a symmetrically rotaional configuration, and the neck being provided with an externally extending annular projection forming a first pouring no-drip rib at the opening. The rib includes a downwardly extending pouring surface which extends outwardly from the wall. The external profile of the neck is provided with at least one further annular projection forming at least one second no-drip rib. The first pouring no-drip rib and the at least second no-drip rib delimitate an annular recess therebetween.

Due to the fact that the number of pouring pieces has been reduced to one, less material is required, which gives a first cost saving. The finishing costs of the usable container ready for pouring are also lower, due to the fact that the step of providing a further intermediate piece is no longer included. Besides, the preform with closure obtained is more environmentally friendly, due to the fact that recycling no longer requires prior sorting of the different pouring pieces.

Other advantages will emerge from the description which follows of an embodiment of a closable preform according to the invention with reference to the appended drawings.

DESCRIPTION

Figure 3:
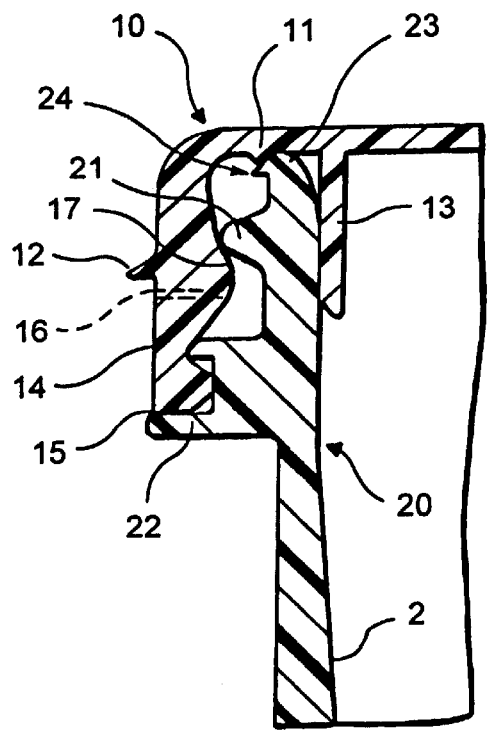
FIG. 3 shows a view similar to that of FIG. 2 with closure cap.

In general, this invention relates to a closable preform intended for containing a liquid. The preform comprises a pouring spout 20 and is closable by means of a closure cap 10 (FIG. 3). The closure cap 10 is in the form of, for example, a flap cover and in this case can be flapped onto the pouring spout 20, which acts as a counter-closure for the closure cap 10.

Figure 1:
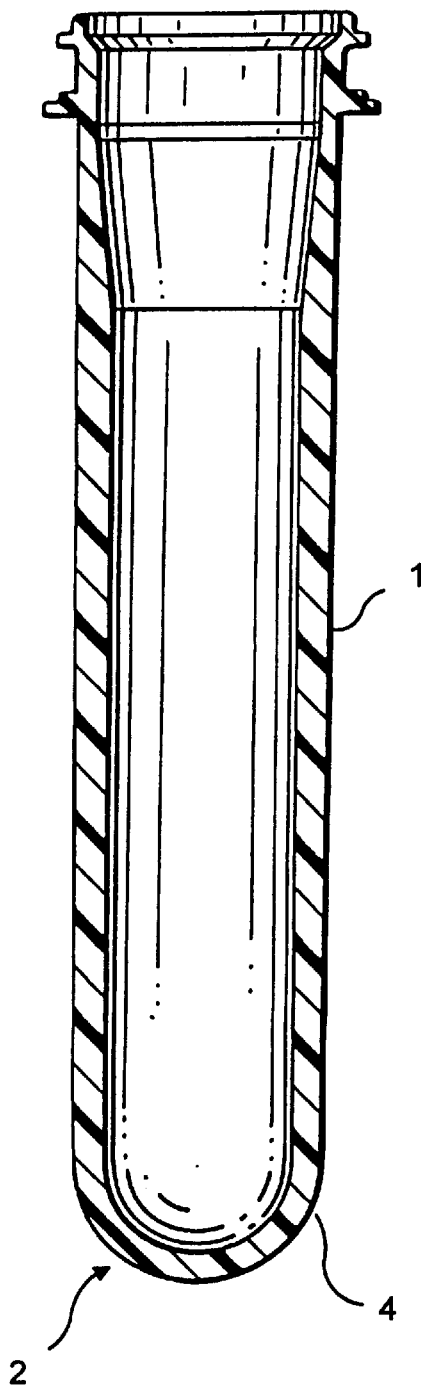
FIG. 1 shows a sectional view along the longitudinal axis of a known preform.

This concerns in particular oil preforms which are obtained by means of a known production process from pre-dried PET granules and which are processed by means of an injection moulding process to give semi-finished products, the so-called oil preforms. In this case the preforms are blown further to the form of, e.g., bottles. The pouring spout 20 is made integral with the preform 2. This has the essential advantage that the production process of closable bottles or containers is considerably speeded up, and the production process is also simpler. Moreover, due to the fact that the container is in one piece and there is no longer an intermediate piece which was required in the known embodiment of FIG. 1, an appreciable saving in weight is obtained as regards the closure.

The preforms are provided with a cap 10 which serves as the closure for the liquid to be contained and as a security ring. A third function is also fulfilled by the cap or closure, namely that of a pouring spout, thanks to which, during the pouring of a viscous liquid such as oil out of the container or bottle, the last droplet is conveyed back into the container or bottle. This prevents soiling of the oil bottle.

As can be seen from FIG. 3, both pouring spout and closure cap are secured by a security ring 14. Ultimately, the cap 10 consists of a single piece which serves as both closure cap and security strip. FIG. 3 also shows a pull tab 12 which is disposed on the side of the closure cap 10, for opening the secured container or bottle by tearing off the ring 14 along, e.g., a perforation 16.

Figure 2:
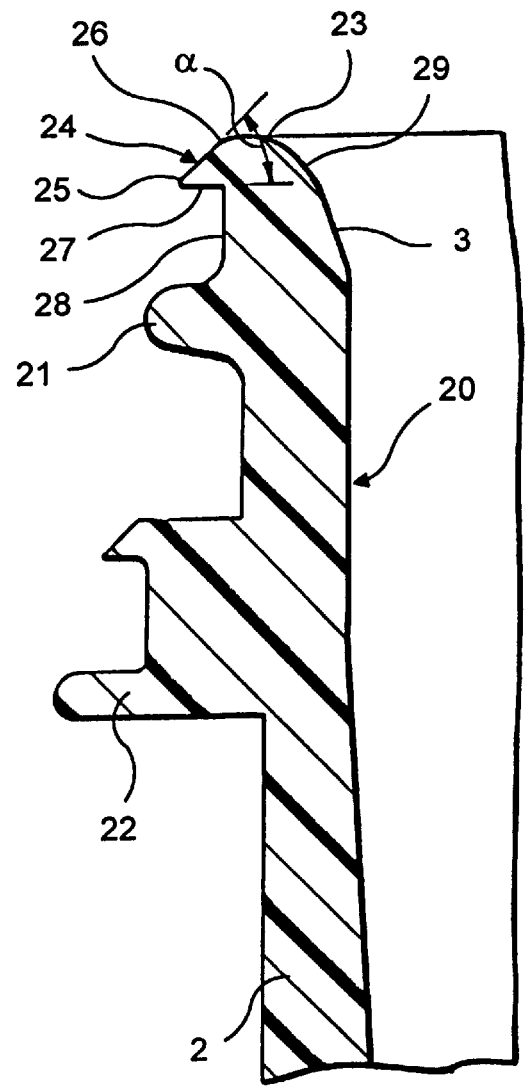
FIG. 2 shows a partial view similar to that of FIG. 1 of a preform according to the invention without closure cap.

It can also be seen from FIG. 2 that the pouring spout 20 has a profiled neck 3, a pouring edge 23 of which forms the division between ah inner surface 29 and an external profile. An encircling projection 24, which is, e.g., pointed 25, is provided on the external profile of the neck 3. The projection 24 extends preferably virtually radially relative to the longitudinal axis of the container. This promotes an efficient droplet discharge. The cross-section of the pointed projection is, e.g., bounded by two virtually straight legs 26, 27, one leg 27 of which extends, e.g., virtually radially relative to the longitudinal axis 1. More generally speaking, the abovementioned projection is bounded by two boundary faces 26, 27 which form an angle α ranging, e.g., between 30° and 80°, preferably between 45° and 65°. A guided and thus more regular trickling of the droplets can thus be obtained. This effect is particularly pronounced if the boundary surface 27 facing the bottom of the container is rounded off with the curvature in the material of the neck.

The inner surface of the neck 3 is advantageously convex, in particular with a stepwise increase of its gradient from the pouring edge 23 towards the bottom of the container. This promotes a regular outflow of the liquid when it is being poured out.

The projection 24 in this case preferably forms a continuation of the curve of the inner surface profile.

The closure cap 10 also has on its bottom an encircling rib 11 which interacts with the spout edge 23, as can be seen from FIG. 3. A good seal is obtained on the container as a result of this. In order to ensure that the closure cap is not screwed or pushed in too far on the pouring spout, thereby possibly also causing damage to the pouring spout through, e.g., lateral buckling, a seat 22 is provided opposite the free edge 15 of the closure cap 10, which seat acts as a stop for the closure cap and is integral with the pouring spout.

Figure 4:
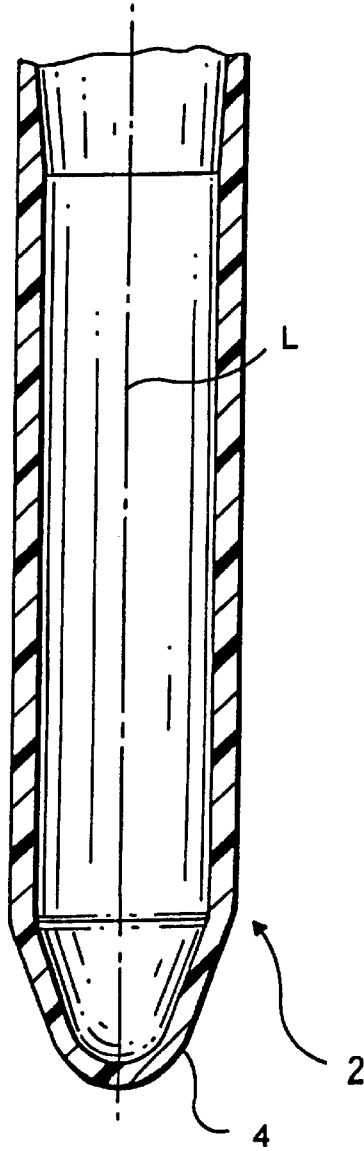
FIG. 4 is a view similar to that of FIG. 1.

FIG. 4 shows a variant of a preform 2, in which the bottom zone 4 has a conical profile. This embodiment is suitable in particular for forming into bottles of square section and permits a better material distribution over the bottle. In any case, excess material on the bottom of the finished bottle can be prevented by it. What this means is that, with the same wall thickness after blowing of the bottle, an appreciable weight saving can even be obtained. The bottom profile and the apex angle are such that nesting of preforms when they are stacked is avoided.

The preform may have an external profile of the pouring spout being provided with various encircling wells, which are separated from each other by adjacent ribs 31, 31', 32. This ensures that liquid droplets which have escaped from the projection 34 are retained through being collected in the respective wells, and soiling of the walls of the container is rendered virtually impossible.

Figure 5:
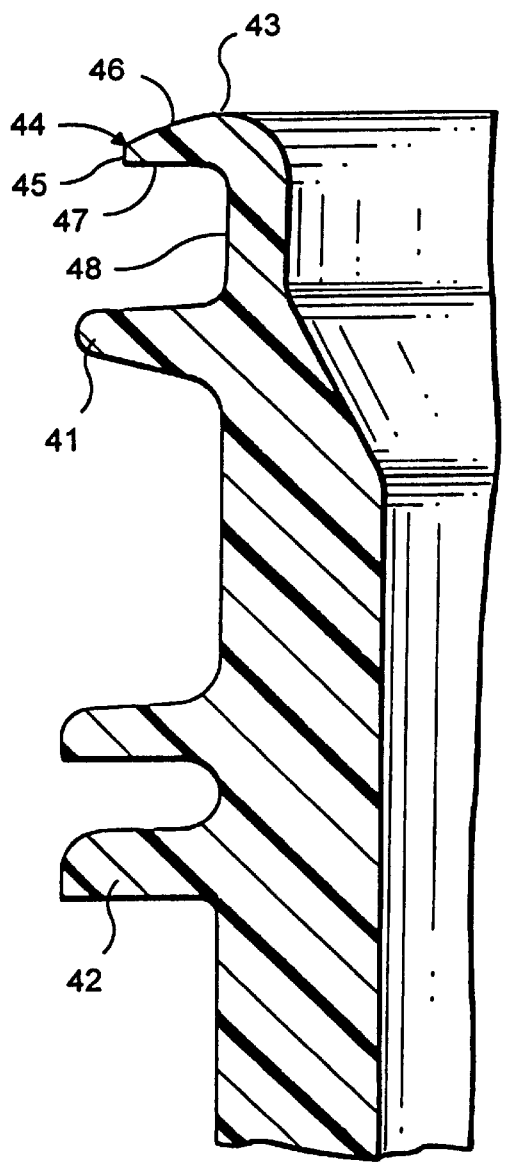
FIGS. 5 to 11 show further variants in a partial view similar to those of FIGS. 2 and 3 respectively.
Figure 6:
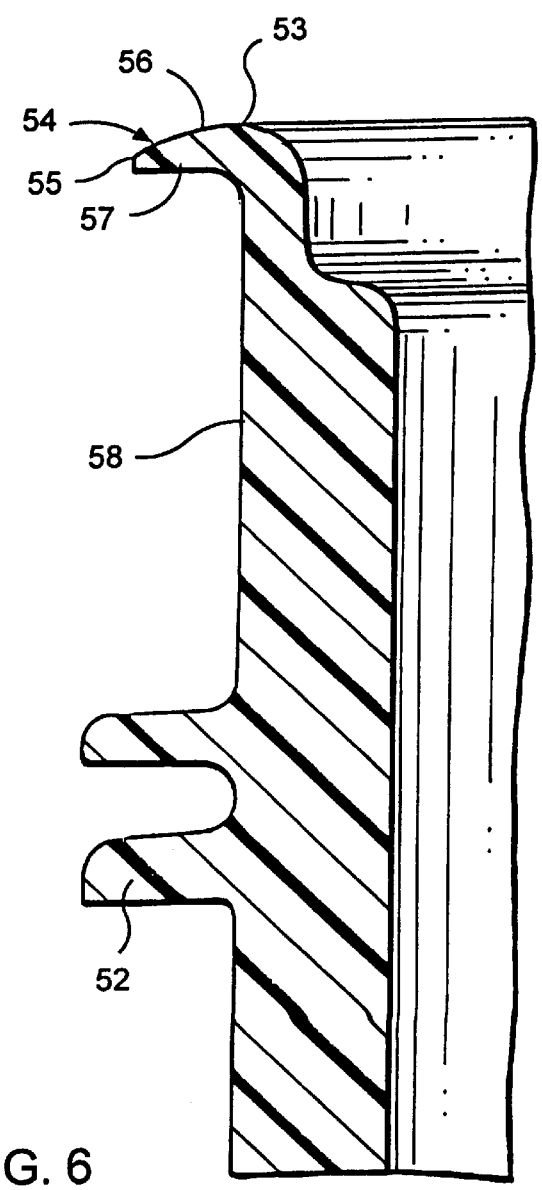

In FIGS. 5 and 6 the projections 44, 54 are in each case truncated at their respective edges 45, 55. This embodiment is particularly advantageous for viscous liquids such as oils. This means that a droplet running down from the pouring edge 43, 53 is interrupted in its movement and, through the viscosity characteristic of the liquid, will have the tendency not to pass the break point of the rounded leg 46, 56. This further avoids liquid running down and soiling the walls 1.

Through the presence of the break point, the mass of inflowing liquid increases there, due to the suddenly accumulating liquid, in such a way that the cohesion increases and the viscous liquid flows back to the pouring edge 45, 55. In order to obtain a good flowback effect, each curved leg 46, 56 has a radius of curvature of, e.g., approximately 1.5 to 2.5 cm, preferably virtually 2 cm. Each further leg 47, 57 is advantageously slanted slightly towards the adjacent well 48, 58. The gradient is, e.g., approximately 2.5° to 8°, preferably virtually 5° relative to the transverse direction of the preform. Each well 48, 58 is bounded by fillets with a radius ranging between 0.2 and 0.6 cm, for example approximately 0.4. The height h of the well is, e.g., of the order of magnitude of a droplet size as additional security against droplet running. A double ring 42, 52 is also provided, for the fitting thereon of the security ring of the closure cap.

Figure 7A:
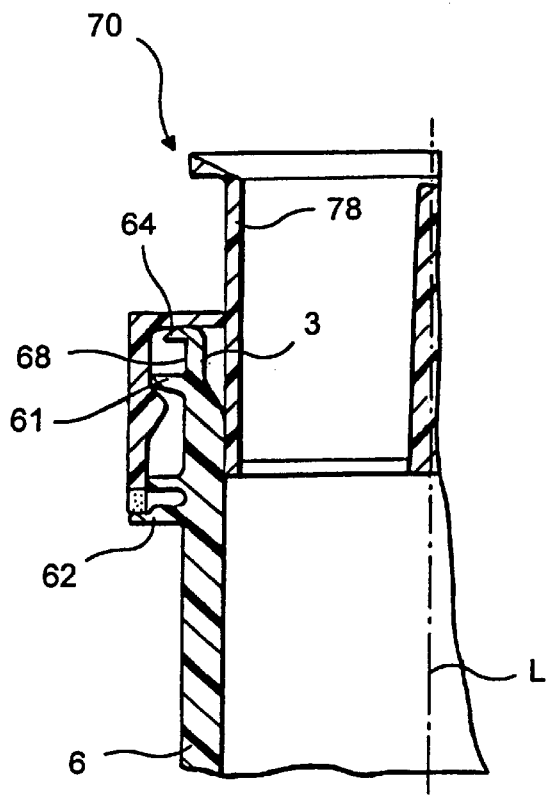
Figure 7B:
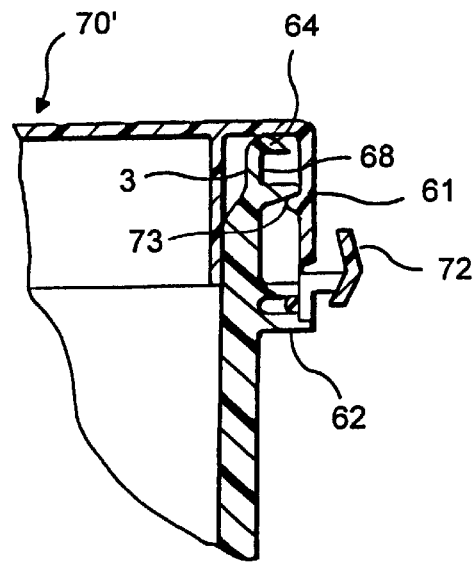
Figure 9A:
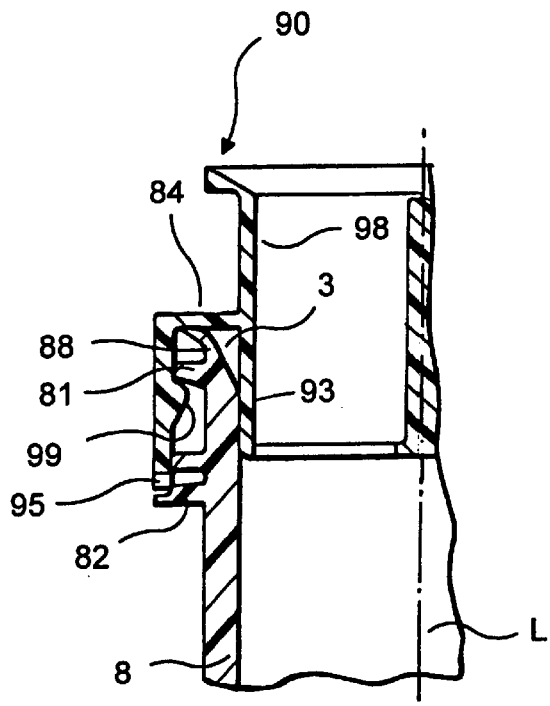
Figure 9B:
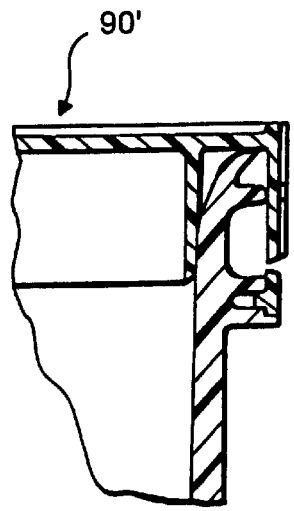

In FIGS. 7a and 7b the preform shown in FIG. 5 is shown with a closure cap 70, 70' fitted thereon. Cap 70 is a so-called two-component cap, and cap 70' is a monocap. These figures illustrate clearly that the same preform 6 can be used for different types of caps. This is illustrated further in a similar way by FIGS. 9a, 9b and 10, in which the same preform 8 can be used for various types of caps, in the last case in FIG. 10 a so-called hinged cap or flap cap 110. This produces a standard preform with universal neck which can be used for various types of caps, including the traditional two-component cap.

Figure 10:
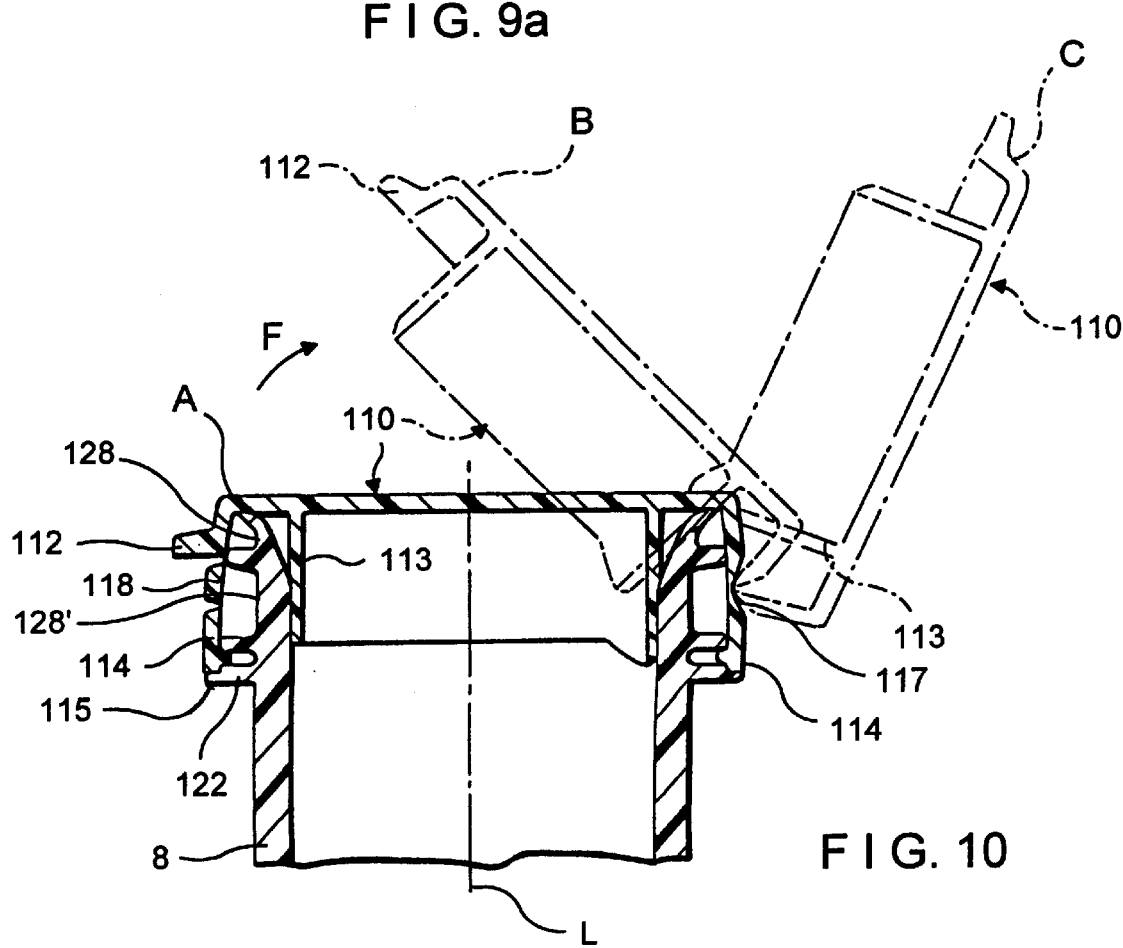

The hinged cap 110 is shown in various positions A, B, C in FIG. 10. Position A represents the closed position, in which the free edge lies against the seat 122.

The pouring opening can be opened by moving the hinged cap 110, by means of pull tab 112, into a deflected position B in the direction of arrow F until it is in a working position C, in which the preform or container can be emptied or its contents poured out. An advantage in this case is that the container can be opened and reclosed in a fairly rapid and handy operation. For all that is necessary is to exert slight pressure on the pull tab in order to overcome the snap connection between closure cap 110 and pouring spout 8. Moreover, during use of the container, i.e. during, e.g., the pouring of liquid present in the container, the closure cap 110 always remains fixed to the container, in hinge connection 117 between the actual closure cap 110 itself and the security strip 114, which is fixed around the neck and serves as a support for the closure cap 110. This means that the closure cap is always to hand and consequently cannot be lost.

Figure 8:
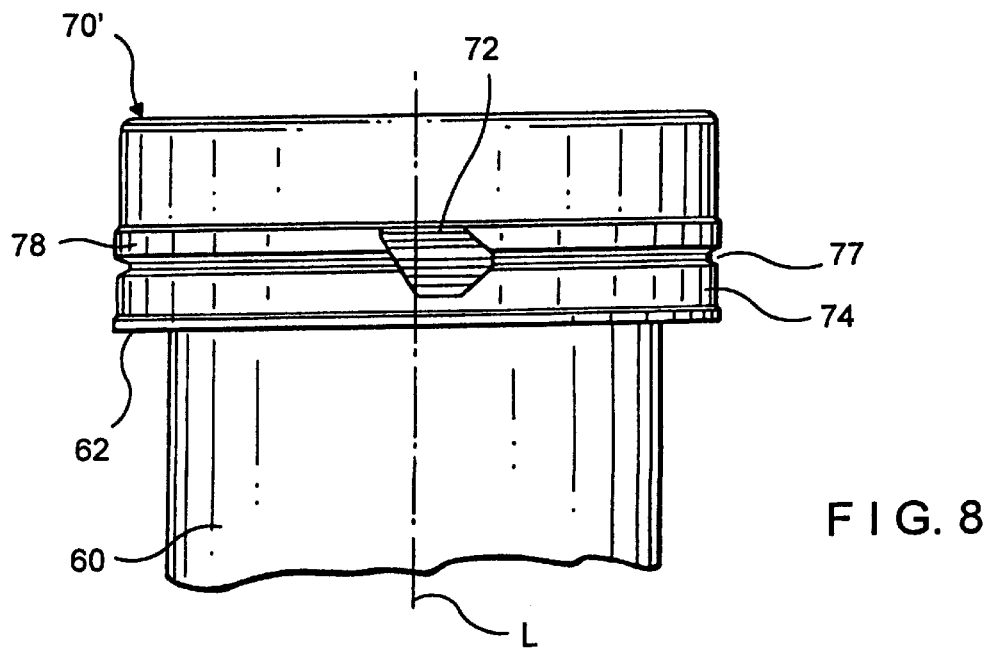

A tear strip running virtually all the way round is indicated by 118. A preform closed by a closure cap 70' is shown in full in FIG. 8. The tear strip 78 to be removed for breaking the seal of the container is separated from the security strip 74 by a thinned section 77.

Figure 11:
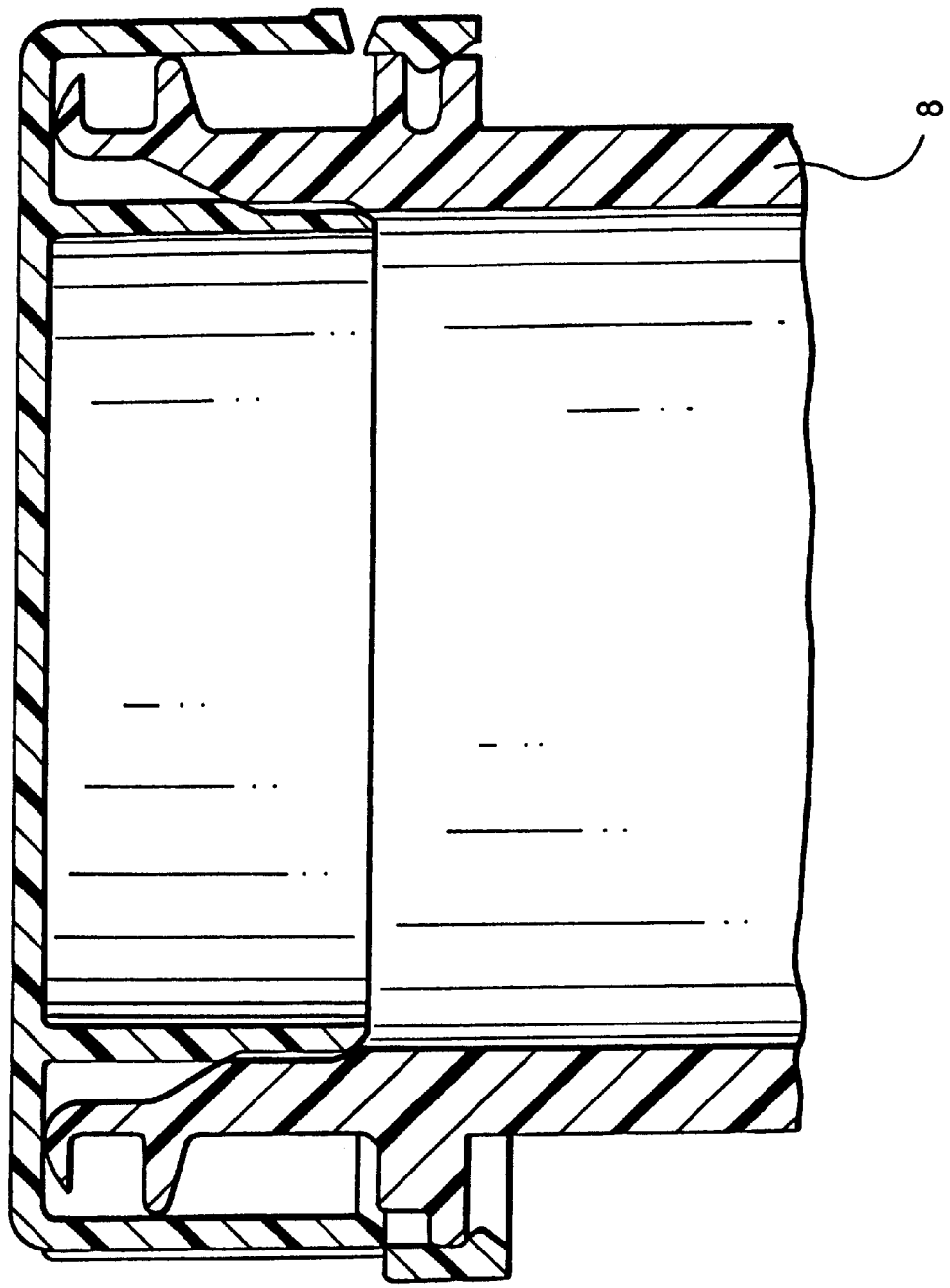

Another variant of the assembly of pouring spout 8 with adapted closure cap is shown further in FIG. 11 on a larger scale.

The security strip 114 in FIG. 10 advantageously extends to a certain height of the further collection well 128', in such a way that in the vertical position of the container a cup is formed by the well at one side and the projecting part of the security strip 114 opposite it, in which cup any running droplets of the liquid in the container can be collected, thus preventing soiling of the walls of the container.

The projecting part indicated by 21, 31, 41 also serves as a counter-closure against forceful closing of the closure cap on the pouring spout. It also serves to clamp thereon the closure cap which has, for example, a bulge 17 which produces a snap connection with the abovementioned projecting part 21, 31, 41. A suitable rounded profile means that good guidance of the closure cap thereon is obtained.

What is claimed is:

1. A preform adapted for blow molding into a container, said preform having a bottom (4), a tubular wall (1) extending upwardly from said bottom (4) in an elongated manner, wherein a part of the wall (1) opposite said bottom (4) forms a pouring spout (20) with a profiled neck (3) encompassing a pouring opening (5), wherein said pouring spout (20) is integral with said tubular wall (1), said spout (20) having a symmetrically rotational configuration, wherein the neck (3) is provided with an externally extending annular projection (24) forming a first pouring no-drip rib at said opening, said rib including a downwardly extending pouring surface which extends outwardly from said wall (1), the external profile of the neck (3) being provided with at least one further annular projection (21, 22) forming at least one second no-drip rib, wherein said first pouring no-drip rib and said at least one second no-drip rib (21, 22) delimitate an annular recess (28) therebetween.

2. A preform according to claim 1, wherein said first rib (24) and each second rib (21, 22) extend convexly with respect to said wall (1).

3. A preform according to claim 1, wherein said first rib (24) is bounded by upper and lower substantially straight surfaces (26, 27) forming an angle ($\alpha$) therebetween, the lower surface (27) of which forms a boundary surface (27) for said recess (28) extending substantially perpendicularly to a longitudinal axis (l) of the preform.

4. A preform according to claim 3, wherein said angle ($\alpha$) ranges between 30° and 80°, preferably between 45° and 65°.

5. A preform according to claim 1, wherein said spout (20) has at least one continuously extending peripheral protrusion which is adapted to engage with an internal engagement means of a closure cap (10, 70').

6. A preform according to claim 5, wherein said pouring spout (20) for closing said pouring opening is provided with at least one rib (21) adapted to sealingly engage said internal engagement means (17) provided on an inner part of a skirt portion of said closure cap (10).

7. A preform according to claim 6, wherein a further rib is provided to sealingly engage a security ring (14, 74) extending from said skirt portion of said closure cap (10).

8. A preform according to claim 1, wherein the inner surface profile of the neck (3) is convex.

9. A preform according to claim 1, wherein the gradient of the inner surface profile increases stepwise from the pouring edge (23) towards the bottom (4) of the preform.

10. A preform according to claim 9, wherein said first rib (24) forms a continuation of the curve of said inner surface profile.

11. A preform according to claim 1, wherein the gradient of the inner surface profile increases continuously from the pouring edge (23) towards the bottom (4) of the preform.

12. A preform according to claim 1, wherein said bottom (4) has a substantially conical profile.

13. A preform according to claim 12, wherein the bottom (4) and an apex angle thereof are such that nesting of preforms when they are stacked is avoided.

14. A preform according to claim 1, wherein said preform is made from PET.

15. A preform according to claim 1, wherein the preform is injection molded.

16. A method comprising subjecting a preform according to claim 15 to a blow molding process to form a container.

17. A method comprising subjecting a preform according to claim 1 to a blow molding process to form a container.

18. A method according to claim 17, wherein the blow molding process maintains the spout configuration of the preform.

19. A preform according to claim 1, wherein said first rib (44; 54; 65; 84) is bounded by at least one curved surface (46; 56).

20. A preform adapted for blow molding into a container, said preform having a bottom (4), a tubular wall (1) extending upwardly from said bottom (4) in an elongated manner, wherein a part of the wall (1) opposite said bottom (4) forms a pouring spout (20) with a profiled neck (3), wherein the neck is convexly curved, said neck encompassing a pouring opening (5), wherein said pouring spout (20) is integral with said tubular wall (1), said spout (20) having a symmetrically rotational configuration, wherein the neck (3) is provided with an externally extending annular projection (24) forming a first pouring no-drip rib at said opening, said rib including a downwardly extending pouring surface which extends outwardly from said wall (1), the external profile of the neck (3) being provided with at least one further annular projection (21, 22) forming at least one second no-drip rib, wherein said first pouring no-drip rib and said at least one second no-drip rib (21, 22) delimitate an annular recess (28) therebetween.

* * * * *